(12) United States Patent
Bogot

(10) Patent No.: US 10,694,235 B2
(45) Date of Patent: Jun. 23, 2020

(54) TELEVISION SIGNAL RECEPTION DEVICE AND SYSTEM

(71) Applicant: ARRIS Global Ltd., West Yorkshire (GB)

(72) Inventor: Carmi Bogot, Maaleh Adumim (IL)

(73) Assignee: ARRIS Global Ltd., West Yorkshire (GB)

( * ) Notice: Subject to any disclaimer, the term of this patent is extended or adjusted under 35 U.S.C. 154(b) by 0 days.

(21) Appl. No.: 15/532,498

(22) PCT Filed: Nov. 26, 2015

(86) PCT No.: PCT/GB2015/053611
§ 371 (c)(1),
(2) Date: Jun. 1, 2017

(87) PCT Pub. No.: WO2016/087823
PCT Pub. Date: Jun. 9, 2016

(65) Prior Publication Data
US 2017/0347141 A1 Nov. 30, 2017

(30) Foreign Application Priority Data

Dec. 1, 2014 (GB) .................................. 1421302.9

(51) Int. Cl.
*H04N 21/258* (2011.01)
*H04N 21/266* (2011.01)
(Continued)

(52) U.S. Cl.
CPC ..... *H04N 21/25816* (2013.01); *H04L 9/0822* (2013.01); *H04L 9/14* (2013.01);
(Continued)

(58) Field of Classification Search
CPC ......... H04N 21/43632; H04N 21/2668; H04N 21/4622; H04N 21/43637; H04N 21/2187; H04N 21/278; H04N 21/235; H04N 21/4334; H04N 21/25816; H04N 21/63345; H04N 21/26613; H04N 21/4367;
(Continued)

(56) References Cited

U.S. PATENT DOCUMENTS 9,681,169 B1\* 6/2017 Neill .................. H04N 21/4181
2002/0146125 A1\* 10/2002 Eskicioglu ............ H04L 9/0825
380/255
(Continued)

OTHER PUBLICATIONS

European Examination Report, Re: Application No. 15813896.6, dated May 11, 2018.
(Continued)

*Primary Examiner* — Anthony Bantamoi
(74) *Attorney, Agent, or Firm* — Stewart M. Wiener

(57) ABSTRACT

The present invention allows the combination and adaptation of a broadcast data reception system with a Conditional Access System which may be embedded in the receiving device, such as a television, or can be provided as a module which is connected to the receiving device and which allows service provider controlled, typically cloud based, interactivity via the same CAS with different Multi Channel video programming distributors (MVPD) service providers.

22 Claims, 9 Drawing Sheets

Figure 2:
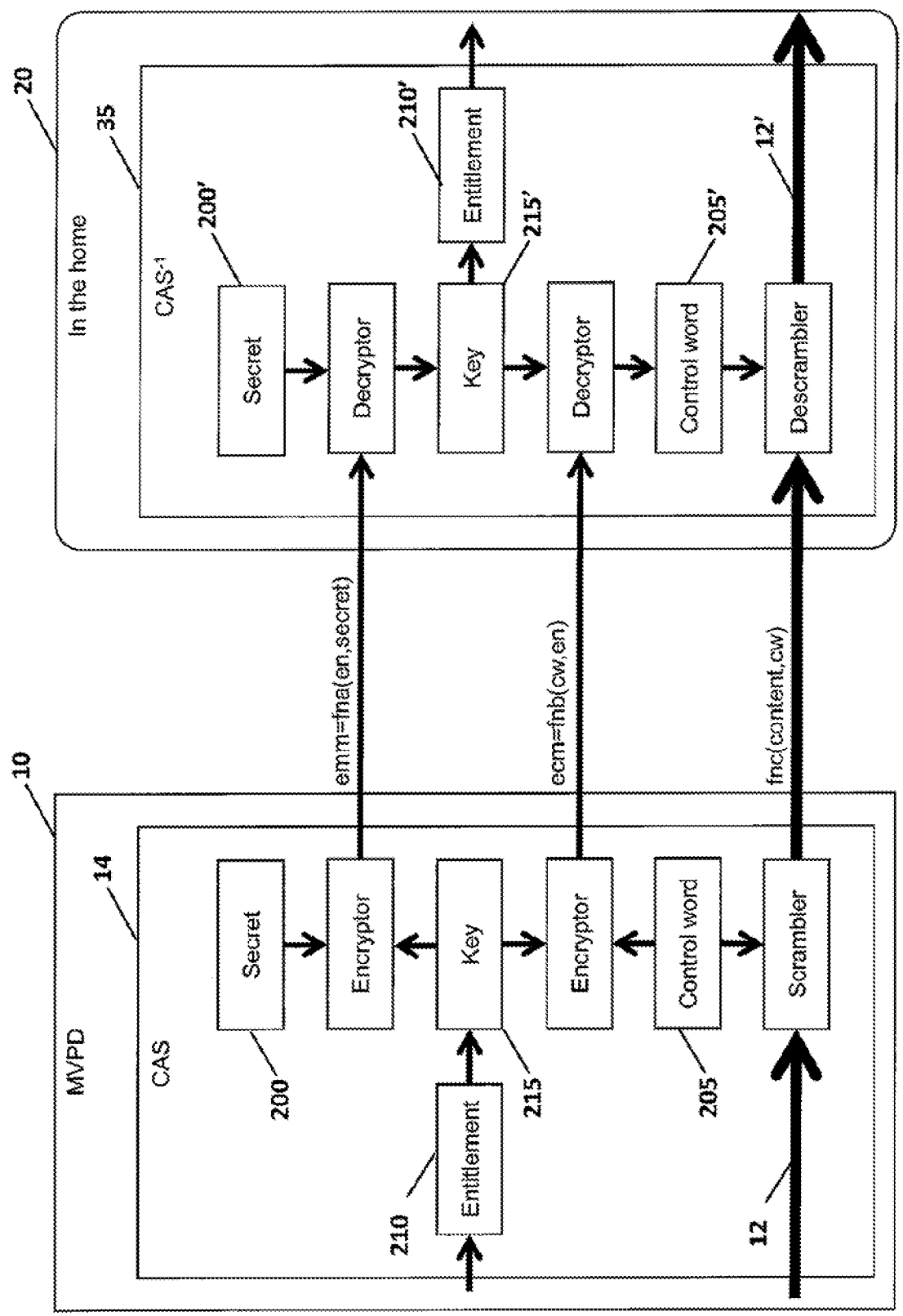

(51) Int. Cl.
  *H04N 21/6334* (2011.01)
  *H04L 9/08* (2006.01)
  *H04L 9/14* (2006.01)
  *H04N 21/4623* (2011.01)
  *H04N 21/418* (2011.01)
  *H04N 21/4367* (2011.01)
  *H04L 29/06* (2006.01)

(52) U.S. Cl.
  CPC . *H04N 21/26613* (2013.01); *H04N 21/63345* (2013.01); *H04L 63/06* (2013.01); *H04N 21/4181* (2013.01); *H04N 21/4367* (2013.01); *H04N 21/4623* (2013.01)

(58) Field of Classification Search
  CPC .. H04N 21/4181; H04N 21/4623; H04L 9/14; H04L 9/0822; H04L 63/06
  USPC ........ 725/27, 82, 34, 100, 106, 134, 131, 46
  See application file for complete search history.

(56) References Cited

U.S. PATENT DOCUMENTS

| | | | |
|---|---|---|---|
| 2004/0158721 | A1 | 8/2004 | Candelore |
| 2013/0347025 | A1* | 12/2013 | Prakash ............. H04N 21/2541 725/25 |
| 2014/0181520 | A1* | 6/2014 | Wendling ................ H04L 29/06 |
| 2014/0282957 | A1* | 9/2014 | Thakore .............. H04L 63/0823 |
| 2017/0078795 | A1* | 3/2017 | Hanes ...................... H04R 5/04 |

OTHER PUBLICATIONS

PCT International Search Report & Written Opinion, Re: Application No. PCT/GB2015/053611, dated Feb. 12, 2016.

Bhagwat, Amol, "DLNA CVP-2 Overview for W3C", Cable Television Laboratories, dated 2013, retrieved from internet URL: https://www.w3.org/2013/10/tv-workshop/slides/14_DLNA%20CVP-2%20Overview-W3C.pptx.

"End-to-End Network Architectures (E2NA); Mechanisms addressing interoperability of multimedia service and content distribution and consumption with respect to CA/DRM solutions", ETSI TR 101 532, Feb. 2015.

Diaz-Sanchez, D., et al., "DLNA, DVB-CA and DVB-CPCM Integration for Commercial Content Management", IEEE Transactions on Consumer Electronics, vol. 56, No. 1, Feb. 2010.

Official Action, Re: Canadian Application No. 2,969,288, dated Jan. 30, 2019.

Official Action, Re: Mexican Application No. MX/a/2017/006995, dated Apr. 2, 2019.

Official Action, Re: Mexican Application No. MX/a/2017/006995, dated Sep. 19, 2018.

* cited by examiner

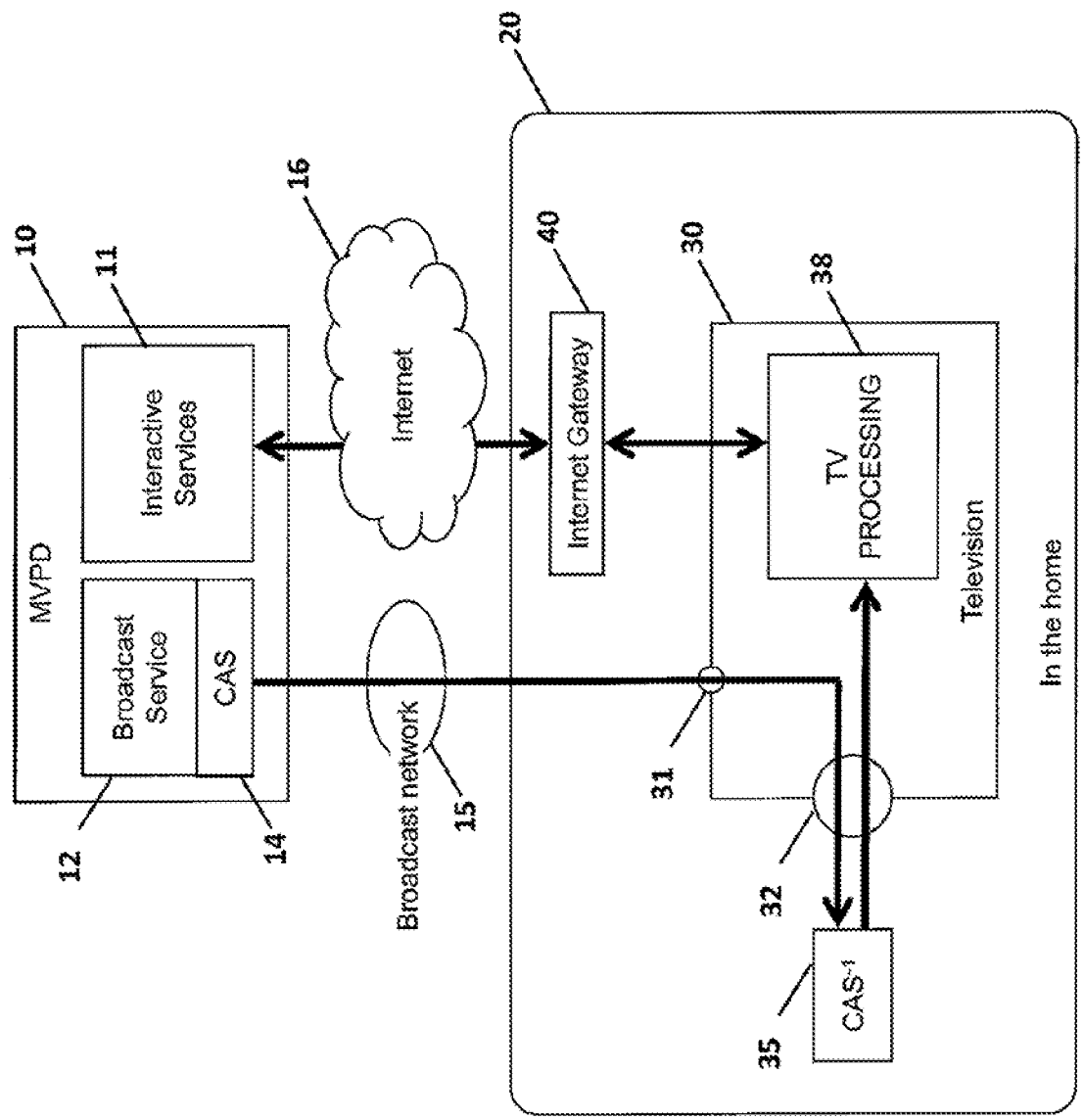
Figure 1a – prior art

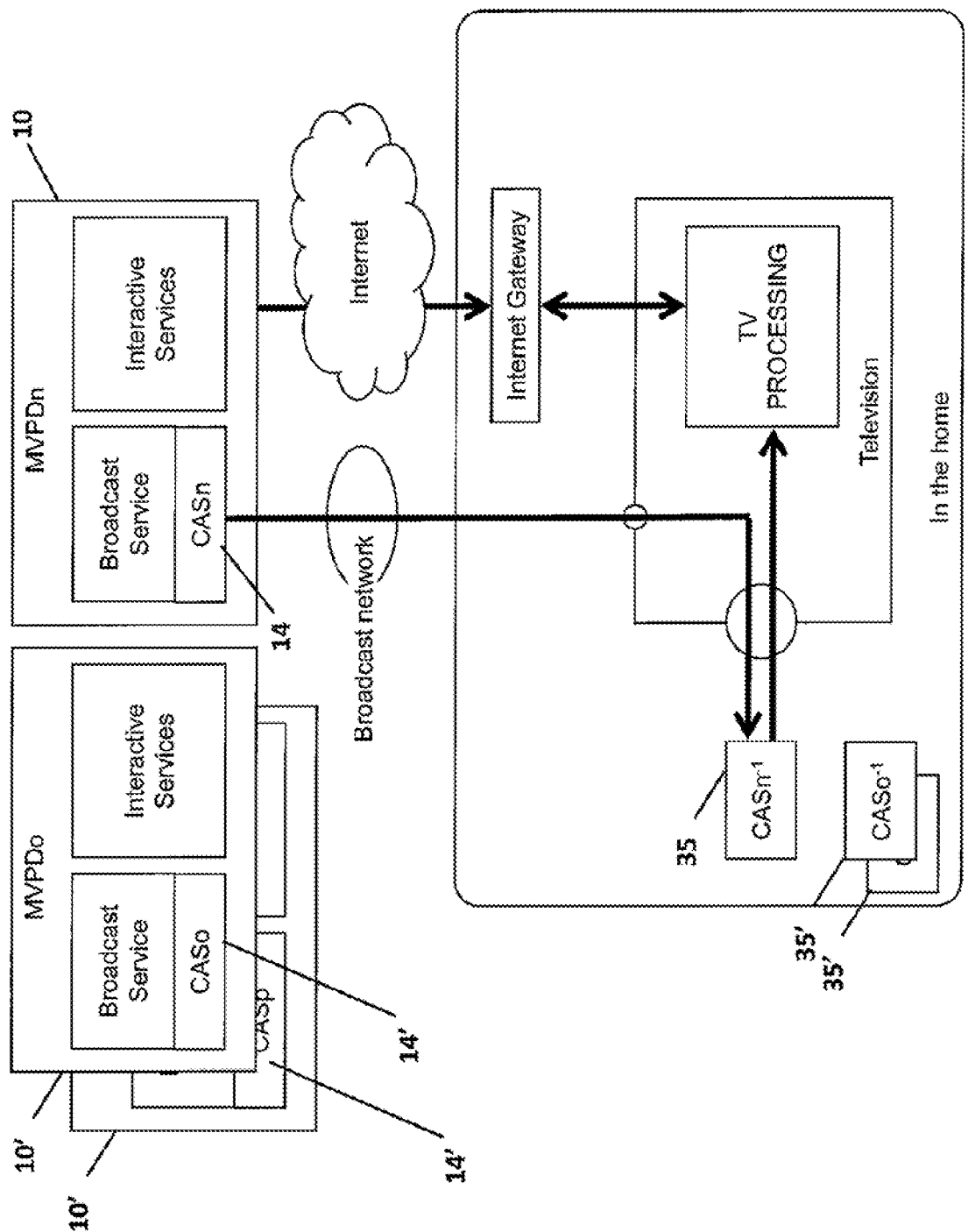
Figure 1b – prior art

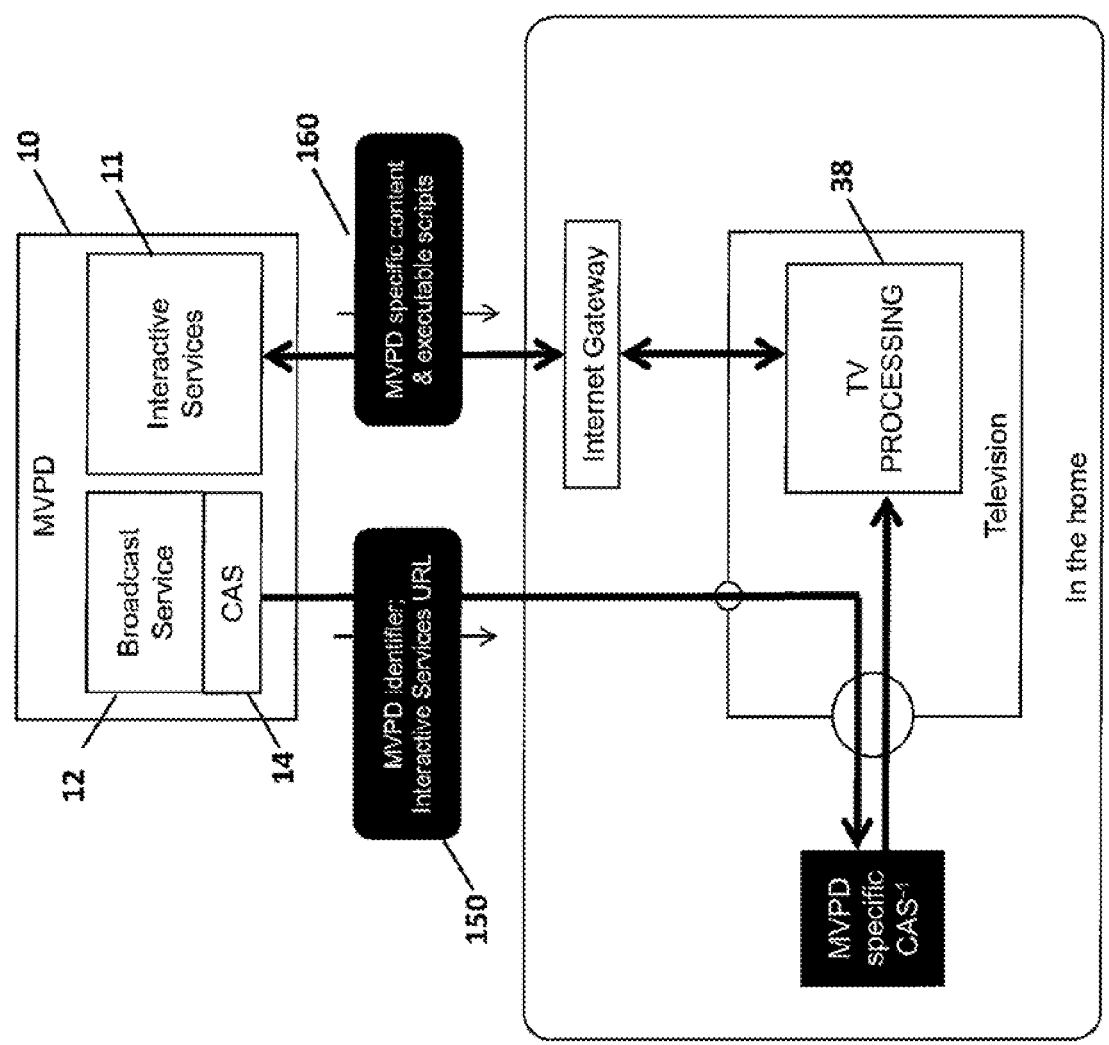
Figure 1c- prior art

TELEVISION SIGNAL RECEPTION DEVICE AND SYSTEM

The invention relates to the provision of a signal reception and display device and system, such as a television apparatus and particularly, although not necessarily exclusively to a device and system which is adaptable in order to allow Conditional Access to the same to be made possible.

Traditionally, multichannel video programme distributors (MVPDs, or otherwise often known as PayTV providers) have made use of reception systems incorporating bespoke technologies, such as CAS (Conditional Access Systems) in order to ensure tight control over the valuable services they were delivering and to prevent unauthorised access or use of the services.

Whereas television manufacturers, typically companies involved in the production of mass market consumer electronics, prefer to incorporate only standardised and widely used technologies; thereby reducing the need for many variations of a product, and avoiding encumbering every product with the technology costs of specific but not ubiquitous sectors (eg. regional and/or service provider specific variations).

The apparatus commonly known as a Set-top-box or broadcast data receiver has traditionally addressed this gap, providing the service and/or region specific technology in a device, connected to, but outside of, the television apparatus such that the manufacturer of the television apparatus does not have to include the system or device at the time of manufacture of the television and the services to be provided by the set top box can be implemented at the particular consumer location at which the television is to be used by connection of the set top box to the television, typically by cable connections.

The broadcast and consumer electronics industries continue to take steps to close this gap, whilst struggling with the challenge that rapidly changing technologies and new emerging business models bring.

The aim of the present invention is to provide means whereby the gap and difference between the requirements of the television apparatus manufacturer and the requirements of the end user of the apparatus, in terms of the specific services that they need to be provided, is reduced. A further aim is to allow the apparatus to be provided in a form which provides the desired services to the user without the need to add significant complexity to the apparatus and/or to the method of use of the same by the end user.

In accordance with a first aspect of the invention, there is provided apparatus for the provision of one or more services to an end user, said apparatus including a service provider broadcast apparatus, a device for the receipt of data, which data is provided to be selectively accessed to allow the generation of the one or more services to the end user via the device, characterised in that said device includes a Conditional Access System (CAS) and the apparatus utilises a combination of two or more of an ETSI Key Ladder, a DLNA-CVP2 Server and/or a DLNA CVP2 Client to interact with a CAS of the service provider so as to allow the said data signals to be selectively accessed.

In one embodiment the device includes a display screen and/or speakers.

In another embodiment the device is connected to a display screen and/or speakers.

Typically the Conditional Access System of the device includes each of the ETSI Key Ladder, DLNA-CVP2 Server and DLNA CVP2 Client.

In one embodiment the DLNA Server and the DLNA Client are integrated.

In one embodiment the said device is any of a television, tablet, or other form of device which includes a display screen.

In one embodiment, the DLNA-CVP2 certificate authentication mechanism is adapted to also deliver the ETSI key ladder ID to the controller of the Conditional Access System.

Typically the CAS is embedded within the said device using the ETSI Key Ladder technology.

In a further aspect of the invention there is provided a device for the provision of one or more services to an end user, said device allowing selective access to received data to allow the generation of the one or more services to the end user, characterised in that said device includes a Conditional Access System which utilises a combination of two or more of an ETSI Key Ladder, a DLNA-CVP2 Server and/or a DLNA CVP2 Client so as to allow the said data signals to be selectively accessed.

A method for providing access to one or more services provided by one or more service providers to an end user via a data receiving device by selectively accessing data received by the device via a Conditional Access System (CAS), characterised in that said method includes the steps of; performing an authentication of the received data using an authentication service provider, and, if authentic, communicating the identification (ID) of a CAS of the data receiving device to the service provider, deriving whether there is an association between the device ID and the service provider Vendor ID and communicating information indicating any derived association to a CAS of the service provider which, if there is an association, derives a Root Key and one or more service keys for the said data receiving device and wherein the Vendor ID is also communicated to the CAS of the data receiving device to allow that CAS to derive the same Root Key.

In one embodiment the authentication of the data is performed using a DLNA Server using the authentication service provider. In one embodiment the authentication service provider is external.

In one embodiment the communication of the device ID is performed using an ETSI Key Ladder Management provider.

In one embodiment the communication of the Vendor ID to the data receiving device apparatus is via a connection established by an Authentication Service provider.

In one embodiment the data receiving device includes a display screen, or is connected as a separate unit thereto.

In one embodiment the connection is achieved by a Key Ladder Management provider communicating the Vendor ID associated with the device ID to the Authentication Service provider.

In an alternative embodiment the Vendor ID is communicated to the data receiving device using the Broadcast data network.

In one embodiment, the CAS provider and the Key Ladder Management Provider are the same entity.

In one embodiment the data receiving device ID is also communicated directly to the Key Ladder Management Provider which communicates the device ID to the Authentication Service provider which responds indicating whether or not the data receiving device has or has not been successfully authenticated. The CAS can then be enabled for data receiving devices for which successful authentication is indicated.

In one embodiment, if authentication is successful, the data receiving device ID is communicated to a CAS Support provider in which a store of computer programs is maintained and which are designed for execution on the data reception and/or display device.

In one embodiment that execution takes place on a specific security processor within the device.

Typically, each program is designed to provide support functions for the specific CAS, such as for example, additional security processes, like monitoring, counter-measures, implementation of business rules.

In one embodiment, the connection established by Authentication Service provider and the device is further used to communicate the CAS specific support package to the specific device.

In an alternative embodiment, the Authentication Service provider communicates a location from which the device can obtain the CAS specific support package.

In a further embodiment, the CAS specific support package further includes executable functions that map/translate MVPD specific service information into a form suitable for use by the DLNA Server.

The present invention therefore allows the utilisation of standardised technologies which are combined and adapted in a novel way, to further close the gap and so resulting in a television reception system with both an upgradeable embedded Conditional Access System and service provider controlled, typically cloud based, interactivity.

Specific embodiments of the invention are now described with reference to the accompanying drawings: wherein FIG. 1a—illustrates prior art in the form of a known architecture for a modern television reception system FIG. 1b—illustrates how the prior art system of FIG. 1a expands to accommodate multiple MVPD providers.

Figure 3:
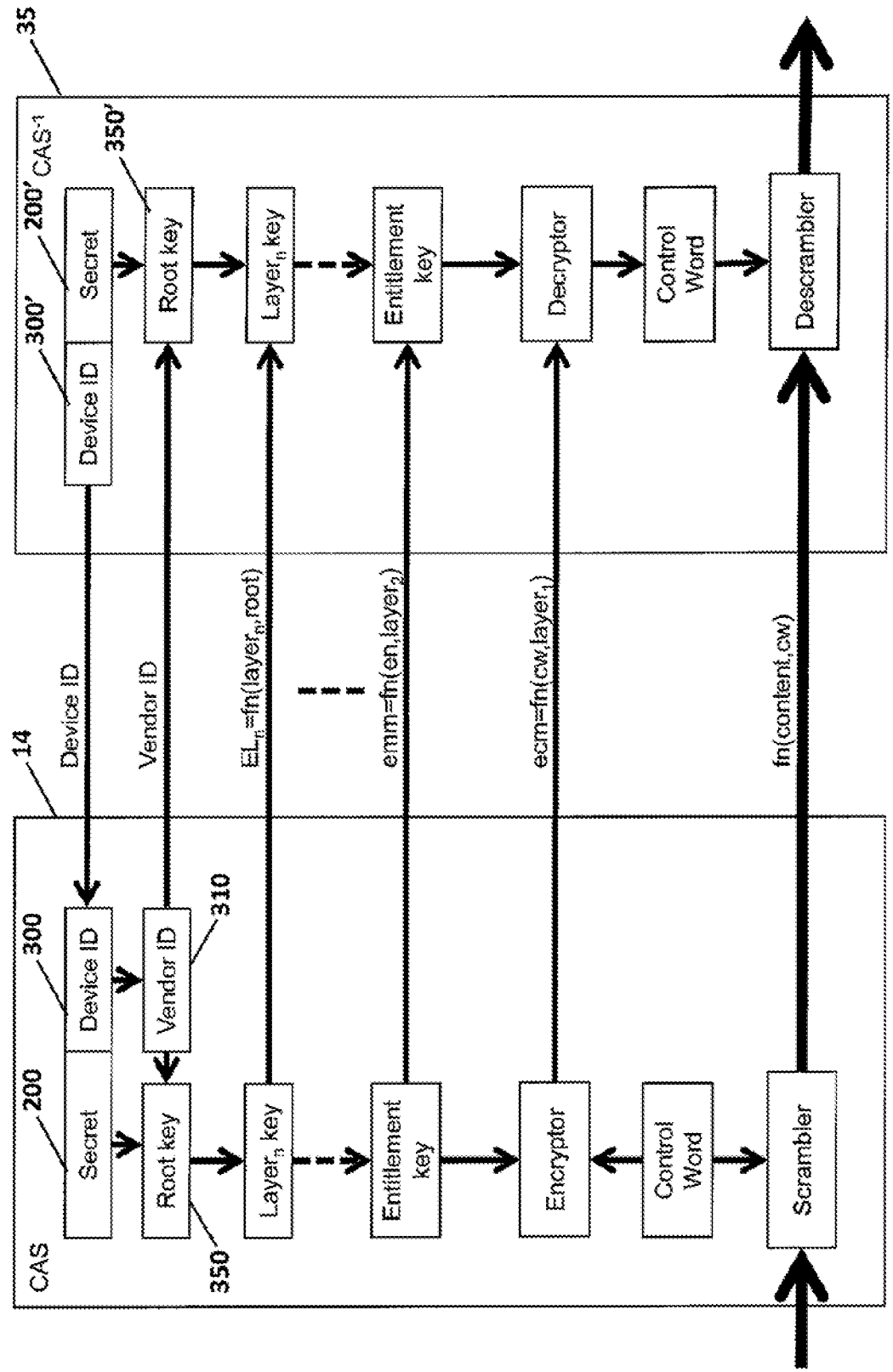
Figure 4:
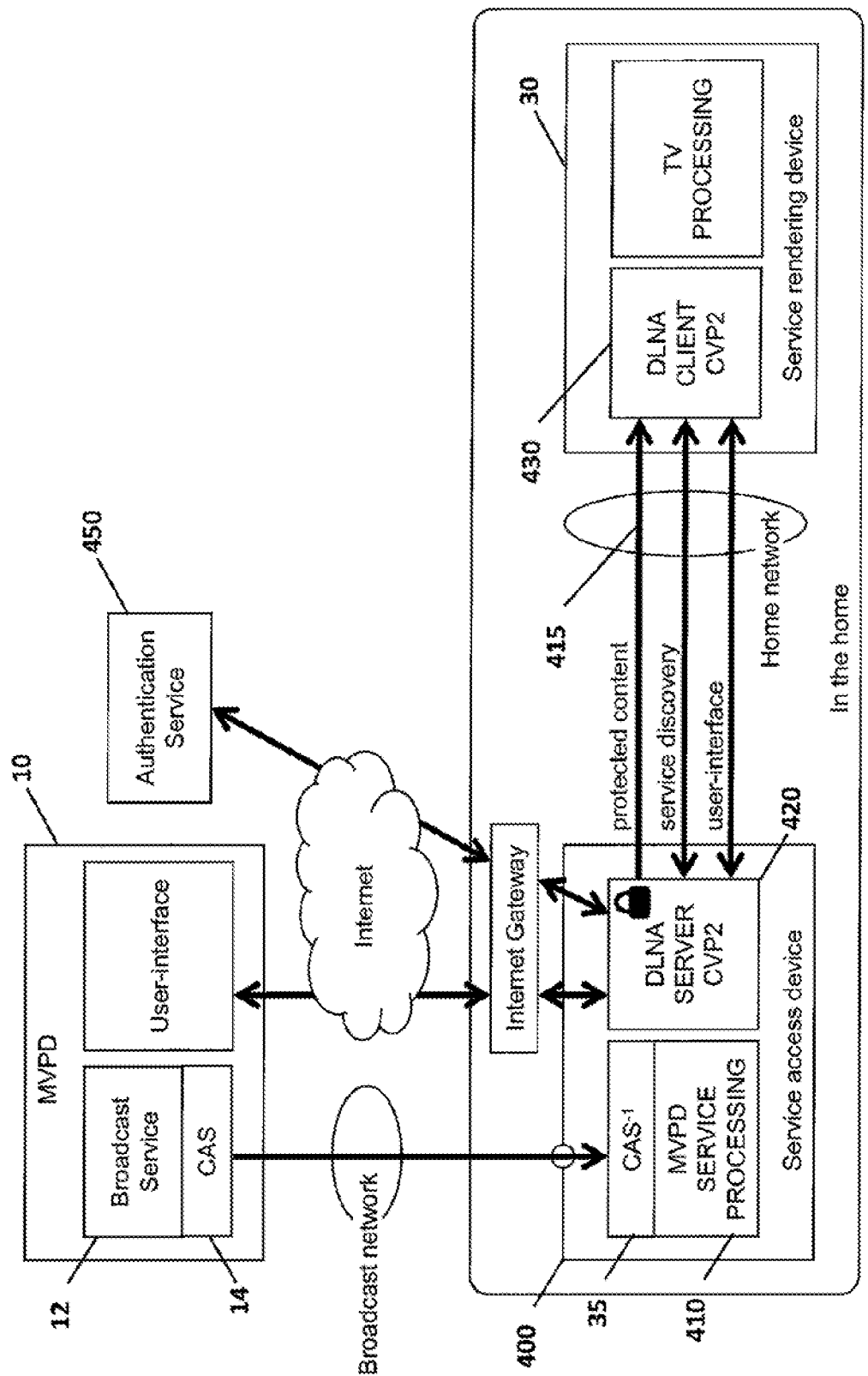

FIG. 1c—illustrates the prior art system of FIGS. 1a and b and key information transfers that facilitate the provision of the selected MVPD service FIG. 2—is representative of a Conditional Access System FIG. 3—illustrates ETSI Key Ladder as part of a Conditional Access System FIG. 4—shows the system envisaged for the DLNA Commercial Video Profile (CVP)

Figure 5A:
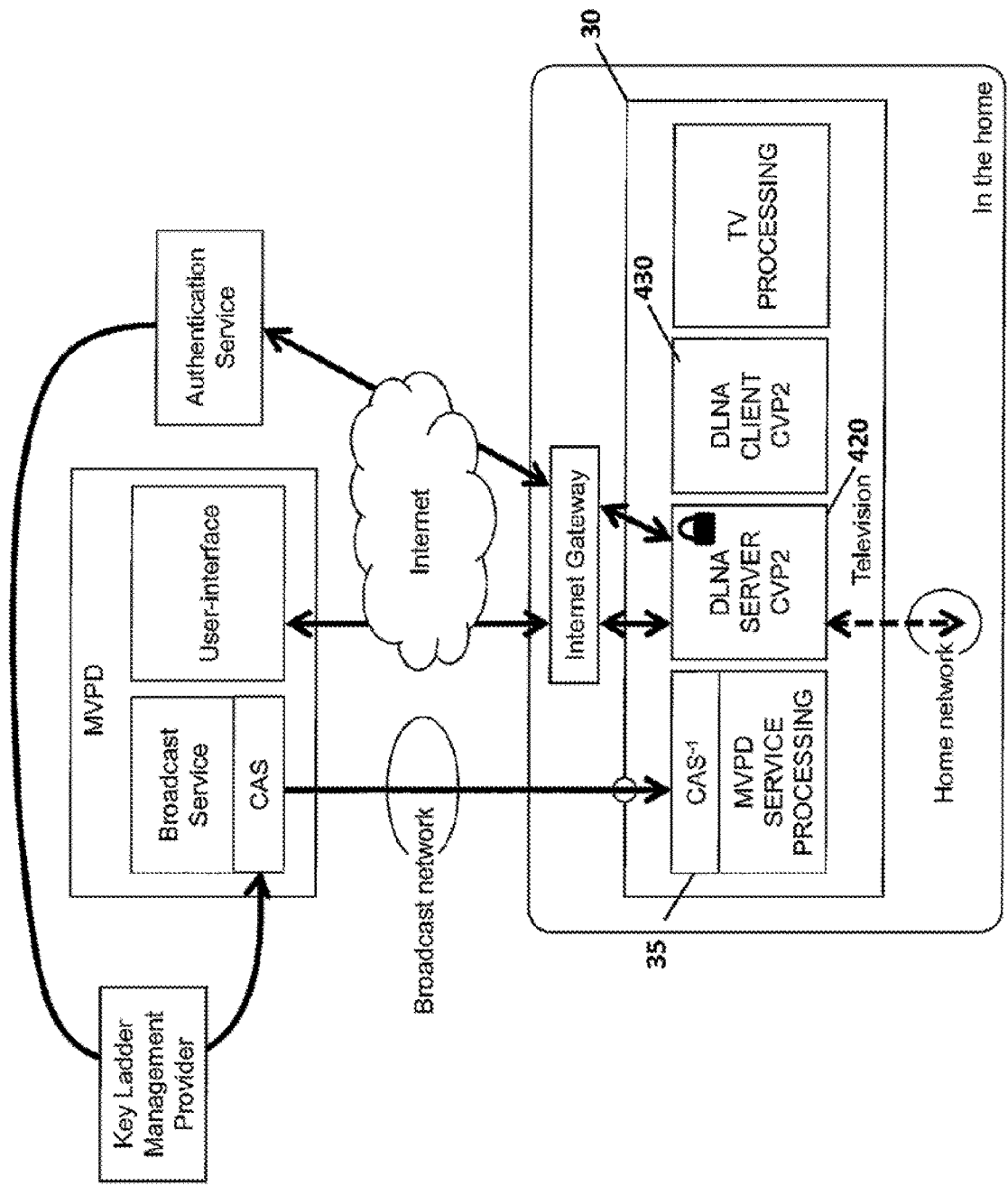
Figure 5B:
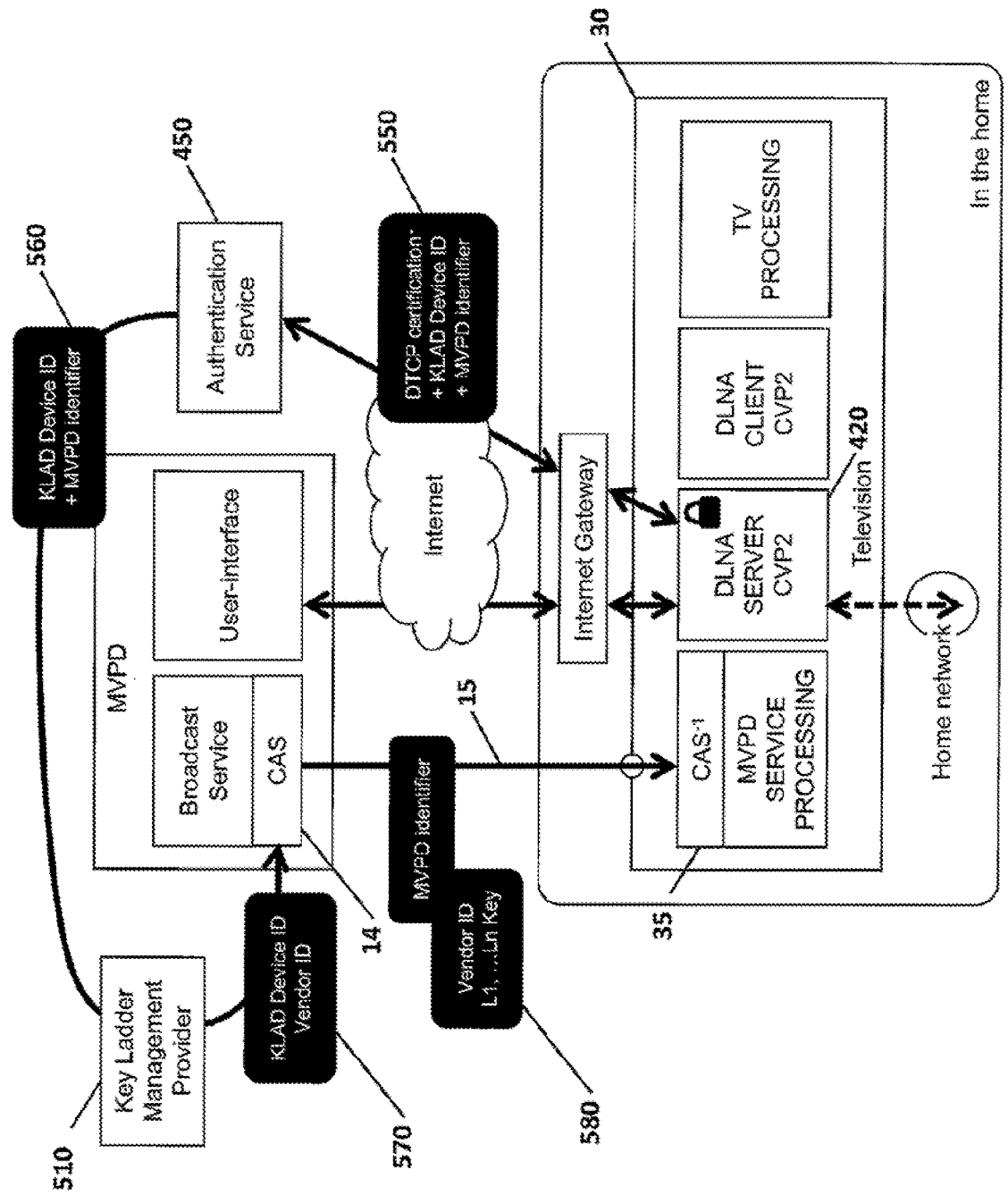
Figure 5C:
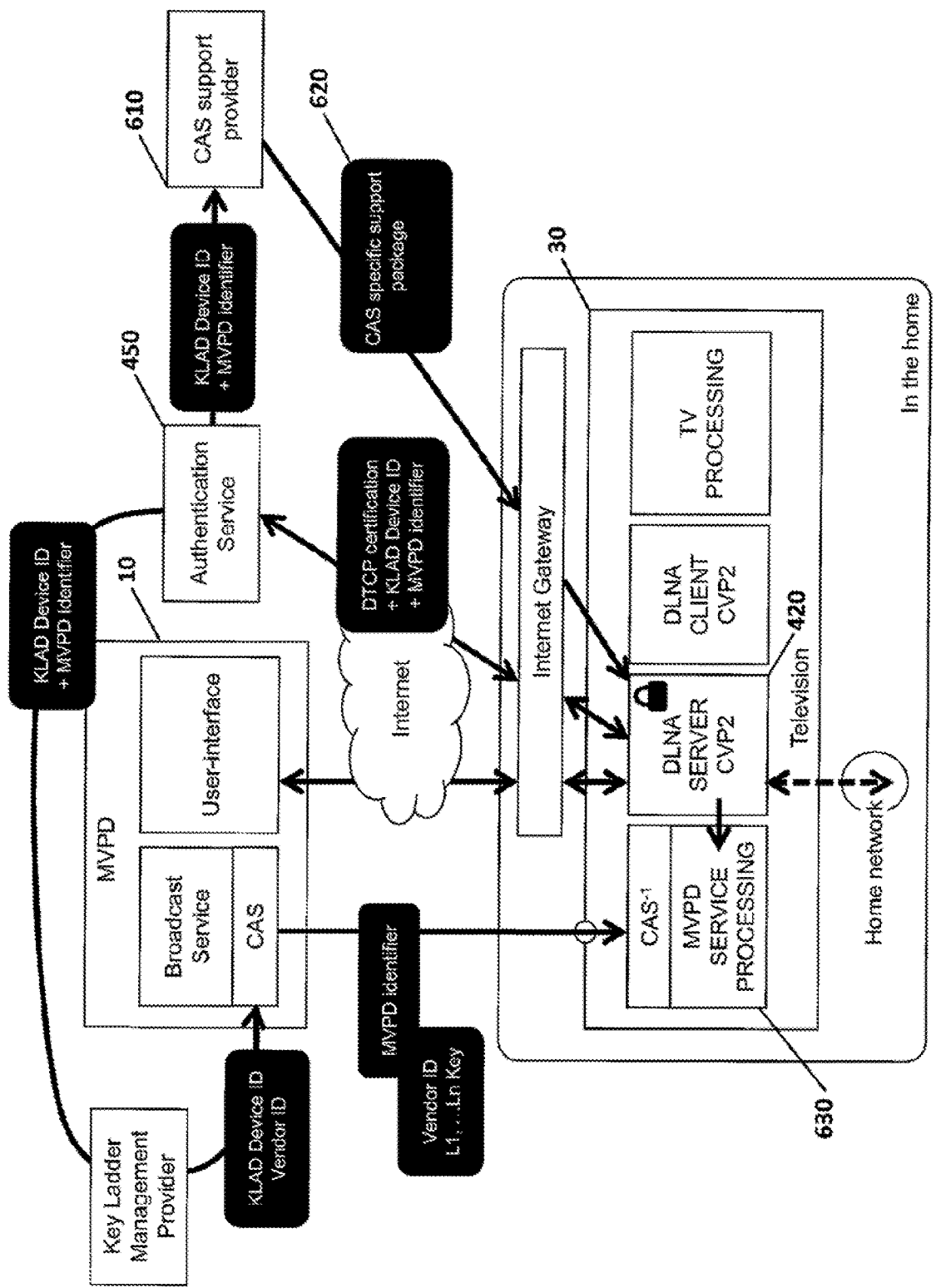

FIG. 5a—illustrates a first embodiment of the system and device in accordance with the invention FIG. 5b—indicates key information transfers in accordance with a preferred embodiment of the invention FIG. 5c—illustrates a further embodiment of the invention Referring firstly to prior art systems of the type illustrated in FIG. 1a, the Multi Channel video programming distributor (MVPD) 10, distributes video programme and related content 12, over a broadcast network 15. A Conditional Access System (CAS) 14, is used to scramble the content using encryption mechanisms, in order to protect the service from unauthorised access by users of television apparatus, typically those users who have not paid for a particular service which is provided via that Conditional Access System.

At a user location, such as Home 20, there is provided a Television (receiver and display) capable of receiving a broadcast service 12 over a broadcast network 15. Television receiver interface 31 typically comprises a terrestrial and/or cable tuner and demodulator (some Television receivers may also include other broadcast network interfaces, such as Satellite). In order for Television 30 to be able to process the CAS 14 protected, MPVD 10 specific, service 12, it must first decrypt the service using the specific corresponding Conditional Access System 35. In conventional Television receivers 30, this Conditional Access System 35, is provided as a plug in module, connecting to the Television through interface 32. In Europe this interface is typically a Personal Computer Memory Card International Association (PCMCIA) style interface using the Common Interface standard. In the United States, this interface is known as Cablecard or POD, (Point of Deployment module). In both cases, the CAS used by the receiver is separable from the Television receiver.

FIG. 1b, illustrates a first problem with this conventional system in that in order to operate correctly, the MVPD 10 requires the CAS 35 to be installed in Television 30, in order for the Television to be capable of processing that MVPD's service. However, many other MVPDs 10', can also be broadcasting their services and these are also capable of reception by the Television. However, the alternative MVPD's require an alternative CAS 35' to be inserted into or connected with the Television. This is particularly inconvenient to the user of the Television and requires many different CAS devices to be manufactured and distributed for each form of MVPD in order for the appropriate CAS to be available for fitment to the television apparatus in order to allow the matching MVPD to be processed.

FIG. 1c, shows, at a high-level, certain identifying information exchanged in order to provide the MVPD service. Broadcast Service 12 of MVPD provider 10, includes the transmission of information 150, comprising information identifying the specific MVPD and further including information identifying a location on the internet from which associated interactive services can be accessed. TV processing system 38, accesses the Interactive Services 11, using the location information 150, thereby receiving further content and/or executable scripts 160 for processing and displaying to the viewer. Standardised forms of this system exist, such as the ETSI HBBTV (Hybrid Broadcast Broadband TV) increasingly adopted in Europe and the DTG DBook, specifically used in the UK.

FIG. 2 illustrates a relatively basic Conditional Access System. The content 12, typically a television or radio programme or other service, is scrambled using Control Word 205. Service access entitlements 210, (eg. derived from checking whether a specific viewer has a subscription) are used to produce a key 215, which is used to encrypt the Control Word 205. A shared secret 200, is used to encrypt the key 215. At the receiver device, the CAS 35, using the same secret 200', recovers the service access entitlements 210' and the key 215'. If the service entitlement of the user of that device is acceptable, the key 215' can then be used to derive the Control Word 205'. Control Word 205' is then used to produce descrambled content 12' from the scrambled content and so the content is available to the user via that device, such as the television apparatus.

Commercially practical Conditional Access Systems make use of a hierarchy of keys to both segment the system into manageable groups and protect the shared secret. This key layering (often called a key ladder) has been standardised in ETSI TS 103 162 and is illustrated in FIG. 3. FIG. 3 further shows how a device specific secret 200' is associated with a data receiving device ID 300'. This allows CAS 14, to identify the secret 200, associated with the specific device; thereby allowing many different secrets to be used amongst the different devices. CAS 14, either by itself, or in conjunction with another party, (for example a Trusted Authority, not shown) maintains an association between the Device ID 300, and a specific Vendor ID 310. This Vendor ID is an identifier for, most typically, a Service Provider (MVPD), or CAS provider, or Equipment Manufacturer. The Vendor ID is used in conjunction with the specific Secret 200 to derive the Root Key 350. The Vendor ID is communicated to the receiver's CAS 35, so it too can derive the same Root Key 350'. The Root Keys 350, 350' are then used to create the layer of keys.

The DLNA (Digital Living Network Alliance) is an industry consortium developing standards that enable in-home, connected devices to discover, access and render various services (such as for example multimedia content). FIG. 4 illustrates a recently completed standardisation effort to allow Commercial content to be made available on the home network. CVP is the Commercial Video Profile of the more general DLNA discovery, access & rendering technologies. The Commercial Video Profile addresses a need introduced by the FCC to separate the Service Access device (typically a Set-top-box) 400, from the Service Rendering device 30 (typically a Television, but now often also a tablet, PC, or other display device). The Service Access Device 400, receives the MVPDs 10, broadcast service 12, protected with CAS 14. It removes the CAS 35, and extracts information 410, associated with the Broadcast service 12, for presentation by the DLNA Server 420, which makes that information accessible to devices, such as televisions or other display devices which are connected, such as connected across a home network in a standardised form. As the broadcast service 12 comprises valuable commercial content, the transfer of that content 415, across the home network is protected from copying. The DLNA server 420, in the service access device 400, performs a standardised authentication of the DLNA client 430, in the Service rendering device 30, prior to transferring encrypted content. The credentials used in that authentication may also be established (or rejected) using an external Authentication Service provider 450.

FIG. 5a illustrates an embodiment of the invention. Television 30, combines the DLNA Server 420 and the DLNA Client 430 in the same device. The device CAS 35, which, conventionally was implemented in an external module when used directly with a television, is now embedded using the ETSI Key Ladder technology.

FIG. 5b illustrates a preferred system for initialising the ETSI Key Ladder based CAS 35. When DLNA Server 420 performs an authentication, using external authentication service provider 450, the Device ID 300' of the CAS 35 is also communicated 550. The trusted authentication service provider 450, communicates this Device ID 560, to an ETSI Key Ladder Management provider 510, which derives the association between the Device ID and the Vendor ID 310, (typically identifying the MVPD or CAS provider) and communicates that information 570, to the CAS 14 of the service provider. CAS 14 can then derive the Root Key 200 and subsequent service keys for the specific receiver Device 30. The Vendor ID 310, is further communicated 580, to the receiver device CAS 35, enabling it to derive the same Root Key 200'.

In a preferred embodiment, the communication of the Vendor ID 310, to the receiver device 30, makes use of the connection established by Authentication Service provider 450. This is achieved by Key Ladder Management provider 510 communicating the Vendor ID associated with the Device ID to the Authentication Service provider 450. Alternatively, and as shown in FIG. 5b, the Vendor ID 310 is communicated to the device using the Broadcast network 15. In a further embodiment, the CAS 14 of the provider and the Key Ladder Management Provider 510, may be the same entity.

In an alternative embodiment of the invention, the Device ID 300' is also communicated directly to the Key Ladder Management Provider 510. The Key Ladder Management Provider communicates the Device ID 300' to the Authentication Service provider 450, from which the Authentication Service provider responds indicating whether the device has or has not been successfully authenticated. The CAS is then enabled for devices that succeed authentication.

FIG. 5c illustrates a further enhancement to the invention. Following successful authentication by Authentication Service provider 450, the Device ID 300' is communicated to a CAS Support provider 610. CAS Support provider 610, maintains a store of computer programs, these programs designed for execution on the device 30. In a preferred embodiment, that execution takes place on a specific security processor within the device 30. Each program is designed to provide support functions for the specific CAS 35, such as for example, additional security processes, like monitoring, counter-measures, implementation of business rules.

In one embodiment, the connection established by Authentication Service provider 450, and the device 30, is further used to communicate the CAS specific support package 620, to the specific device 30. In an alternative embodiment the Authentication Service provider 450, communicates a location from which the device 30, can obtain the CAS specific support package 620 which could, for example, be obtained from either the Internet or from the Broadcast network.

In a further enhancement to the invention, the CAS specific support package further includes executable functions 630, that map/translate MVPD 10, specific service information (such as for example, program information broadcast in non-standardised form) into a form suitable for use by the DLNA Server 420.

Although the invention has been illustrated by way of integration within a Television device, the invention is not limited to Television devices. Furthermore the invention is not limited to integration within a Television device, as an alternative embodiment of the invention the functions 35, 410, 420 in the forms described herein, could be implemented in a detachable module connected to the device, similar to FIG. 1a. This detachable module would no longer be service provider specific, and would be adapted to the specific service providers needs using the system herein disclosed.

The invention claimed is:

1. An apparatus for the provision of one or more services to an end user, said apparatus comprising:
   a data receiving device for the receipt of data, the data receiving device comprising a Conditional Access System (CAS); and
   a service provider broadcast apparatus comprising a CAS responsive to receipt of a Vendor ID and a device ID from a key ladder management provider to derive a Root Key and one or more service keys for the data receiving device, and further responsive to the receipt of a Vendor ID to communicate the Vendor ID to a CAS of the data receiving device, the key ladder management provider being responsive to derive at least the Vendor ID from the device ID and to communicate the Vendor ID to the CAS of the service provider;
   the data receiving device further comprising a DLNA-CVP2 Server is arranged to perform an authentication with an authentication service provider and to send a device ID of the device CAS to the authentication service provider, whieh wherein the authentication service provider is further arranged to communicate the device ID to the key ladder management provider, and whieh wherein the device CAS is responsive to receipt of a Vendor ID from the service provider CAS to derive the same Root Key as the service provider CAS.

2. The apparatus of claim 1 wherein the data receiving device includes a display screen and/or speakers.

3. The apparatus of claim 1 wherein the data receiving device is connected to a display screen and/or speakers.

4. The apparatus of claim 1 wherein the apparatus further includes a DLNA CVP2 Client.

5. The apparatus of claim 1 wherein the DLNA Server and the DLNA Client are integrated.

6. The apparatus of claim 1 wherein a DLNA-CVP2 certificate authentication mechanism is adapted to also deliver the ETSI key ladder ID to a controller of the CAS.

7. The apparatus of claim 1 wherein the device CAS is embedded Within the device using ETSI Key Ladder technology.

8. A data receiving device for the provision of one or more services from a service provider to an end user, the data receiving device comprising a Conditional Access System (CAS) and a DLNA-CVP2 Server which DLNA-CVP2 server is arranged to perform an authentication with an authentication service provider and to send a device ID of the device CAS to the authentication service provider, wherein the authentication service provider is further arranged to communicate the device ID to an ETSI key management provider that is arranged to derive at least the Vendor ID from the device ID and to communicate the Vendor ID to a Conditional Access System CAS of the service provider, wherein the service provider CAS is responsive to the Vendor ID to derive a Root Key and one or more service keys for the data receiving device, and wherein the device CAS is responsive to receipt of a Vendor ID from the service provider CAS to derive the same Root Key as the service provider CAS.

9. A method for providing access to one or more services provided by a service provider to an end user via a data receiving device, the method comprising:

performing an authentication of the data receiving device between a DLNA-CVP2 server at the data receiving device and an authentication service provider, the DLNA-CVP2 server sending a device ID of a Conditional Access System (CAS) of the data receiving device from the data receiving device to the authentication service provider, wherein the authentication service provider is arranged to communicate the device ID to a key ladder management provider that is arranged to derive whether there is an association between the device ID and a Vendor ID of the service provider;

communicating, from the data receiving device, information indicating any derived association to a CAS of the service provider, wherein the CAS of the service provider, in response to an association, derives a Root Key and one or more service keys for the data receiving device; and receiving, at the data receiving device, a communication of the Vendor ID from the service provider to the CAS of the data receiving device, to allow that the CAS of the data receiving device to derive the same Root Key.

10. The method of claim 9, wherein the authentication service provider is an external provider.

11. The method of claim 9, wherein the communication of the Vendor ID to the data receiving device is via a connection established by the authentication service provider.

12. The method of claim 9 wherein the data receiving device includes a display screen and/or speakers.

13. The method of claim 9 wherein the data receiving device is connected as a separate unit to the display screen and/or speakers.

14. The method of claim 9, wherein the key ladder management provider communicates the Vendor ID associated with the device ID via the authentication service provider.

15. The method of claim 9 wherein the Vendor ID is communicated to the data receiving device using a broadcast data network.

16. The method of claim 9, wherein the CAS and the key ladder management provider are the same entity.

17. The method of claim 9, wherein the device ID is also communicated directly to the key ladder management provider which communicates the device ID to the authentication service provider which responds indicating whether the data receiving device has or has not been successfully authenticated and, if successful the CAS is enabled for data receiving devices for which successful authentication is indicated.

18. The method of claim 17 wherein if authentication is successful, the data receiving device ID is communicated to a CAS Support provider in which a store of computer programs is maintained and which are designed for execution on the data receiving device, wherein the programs provide support functions for the specific device CAS, and wherein the support functions include additional security processes in the form of at least one of: monitoring, countermeasures, and implementation of business rules.

19. The method of claim 18 wherein the execution is performed on a specific security processor within the device.

20. The method of claim 9, wherein the connection established by the authentication service provider and the device is further used to communicate one or more CAS specific support packages to the device.

21. The method of claim 9, wherein the authentication service provider communicates to the device details of a location from which the device can obtain one or more CAS specific support packages.

22. The method of claim 9 wherein a CAS specific support package obtained by the device includes executable functions that map/translate MVPD specific service information into a form suitable for use by the DLNA Server.

* * * * *